United States Patent
Pezeshki

(10) Patent No.: US 9,167,420 B2
(45) Date of Patent: Oct. 20, 2015

(54) MOBILE TERMINAL SYSTEM

(75) Inventor: Farhad Pezeshki, Toronto (CA)

(73) Assignee: IMS HEALTH INC., Danbury, CT (US)

( * ) Notice: Subject to any disclaimer, the term of this patent is extended or adjusted under 35 U.S.C. 154(b) by 0 days.

(21) Appl. No.: 12/762,926

(22) Filed: Apr. 19, 2010

(65) Prior Publication Data

US 2010/0205436 A1 Aug. 12, 2010

Related U.S. Application Data

(63) Continuation of application No. 10/442,228, filed on May 21, 2003, now abandoned.

(30) Foreign Application Priority Data

May 24, 2002 (CA) .................................... 2387328

(51) Int. Cl.
| | |
|---|---|
| G06F 15/16 | (2006.01) |
| H04W 8/24 | (2009.01) |
| H04L 29/08 | (2006.01) |
| H04L 29/06 | (2006.01) |
| H04W 4/14 | (2009.01) |

(52) U.S. Cl.
CPC .............. *H04W 8/245* (2013.01); *H04L 67/04* (2013.01); *H04L 63/12* (2013.01); *H04W 4/14* (2013.01)

(58) Field of Classification Search
USPC ......... 709/201, 203, 208, 217, 219, 223, 225, 709/250; 717/168, 171, 172, 174, 176, 177; 370/310; 711/100–116
See application file for complete search history.

(56) References Cited

U.S. PATENT DOCUMENTS

| | | | | |
|---|---|---|---|---|
| 6,456,857 | B1 * | 9/2002 | Bos et al. ................... | 455/550.1 |
| 6,891,811 | B1 * | 5/2005 | Smith et al. .................. | 370/310 |
| 7,130,648 | B1 | 10/2006 | Fournier et al. | |
| 2002/0019237 | A1 * | 2/2002 | Uskela .......................... | 455/453 |
| 2002/0057277 | A1 * | 5/2002 | Wood et al. .................. | 345/582 |
| 2002/0059367 | A1 * | 5/2002 | Romero et al. ............... | 709/203 |

(Continued)

OTHER PUBLICATIONS

"bytecode". Downloaded from <http://searchcio-midmarket.techtarget.com/definition/bytecode>. Aug. 2000.*

"ASIC". Downloaded from <http://searchcio-midmarket.techtarget.com/definition/ASIC>. Aug. 2000.*

(Continued)

*Primary Examiner* — Scott B Christensen
(74) *Attorney, Agent, or Firm* — Maldjian Law Group LLC

(57) ABSTRACT

A system, apparatus and method for enabling interaction between a mobile device and a dynamic list of remotely hosted applications. A mobile device is provided with a removable module implementing a virtual machine defined by a set of instructions. The mobile device requests an initial application from an application server. The application server generates a message, including a set of commands and any parametric information, such as text to be displayed, which is then compiled into executable code. The executable code is then forwarded to the mobile device for execution. The mobile device interprets the executable code and runs it, possibly causing text or a menu to be displayed. In a first embodiment, the mobile device requests a list of currently available applications and is provided with such a list by a first application server. The user is then able to select from the list of applications, some which can be located on other servers. In another embodiment, an application server initiates a communication by transmitting a set of commands causing one or more actions on the mobile device, such as the sounding of an audio alarm, the displaying of text, etc.

19 Claims, 3 Drawing Sheets

(56) References Cited

U.S. PATENT DOCUMENTS

2003/0014629 A1\* 1/2003 Zuccherato ............... 713/156
2003/0055735 A1\* 3/2003 Cameron et al. ............ 705/26
2003/0060896 A9\* 3/2003 Hulai et al. ................. 700/1
2003/0110242 A1\* 6/2003 Brown et al. ............... 709/222

OTHER PUBLICATIONS

"Java—a whatis definition", www.whatis.com, Jan. 30, 2001.
Sun Microsystems, "Java 2 Platform Micro Edition (J2ME) Technology for Creating Mobile Devices", May 19, 2000.

\* cited by examiner

MOBILE TERMINAL SYSTEM

FIELD OF THE INVENTION

The present invention relates generally to mobile communication devices, and more particularly relates to the dynamic provision of applications to mobile communication devices via application servers.

BACKGROUND OF THE INVENTION

In the area of wired conventional computer communications, terminals have been in use for at least 30 years. Terminals served as input-output devices, acting merely as an interface between a user and a remote computer. Typically, a terminal consisted of a screen and keyboard, with little or no processing power and no local storage. The terminal, or client, was connected to a host computer, usually a mainframe, by way of a serial line connection. This hard-wiring ensured the security of the transmissions between the host and the client. Characters entered on the terminal were transmitted to the host to be acted on by software resident thereon, and characters generated on the host by the software were transmitted back to the terminal for display to the user. An advantage of the terminal system was that it allowed multiple users to access the processing power and applications resident on the mainframe without attending at the mainframe location. In addition, because of their simple, rugged design, the terminals were inexpensive and tended to outlast early microcomputers.

The concept of terminals has been adapted for use with the Internet through the use of "net-boxes". Essentially, the net-box is a terminal connected to a network by a coaxial or serial line connections so as to allow a user to access and execute software that is resident on remote computers. A net-box, like a terminal, has limited processing power and little or no local storage. It might have a simple operating system or front-end, but more complicated software is located remotely. As with the original terminal, this allows the net-box to be manufactured less expensively and with a simpler, more generic design than a personal computer. The simplicity of design reduces administration costs for such systems as a service provider can modify the functionality provided to the net-boxes simply by replacing the terminal, or application, server or by modifying its configuration to change the applications offered.

Mobile communication devices such as PDAs and mobile phones are simple computers with limited computational power and resources, such as storage, memory and clock frequency. Mobile communication devices can be equipped with client software to communicate with a remote server through a wireless network. Such devices are usually loaded with a few client applications either by the user, the manufacturer or the network operator. It is a common practice to distribute applications through the Internet. Some additional equipment such as a personal computer and special cables and connectors are needed to transfer the client application to the mobile communications device.

In case of GSM (global systems for mobile communications), the embedded SIM (subscriber identity module) card acts as the computer while the handset or device performs the function of the input/output device. SIM cards are preloaded with the desired applications and sent to end-users. Applications loaded onto the SIM card prior to sale to the end-user are primarily developed with a SIM toolkit, such as that available from Gemplus, that employ the SIM toolkit markup language (STKML). STKML is not unlike HTML and, as such, there is an inherently large overhead associated with transmitting commands that access remote device control functionality from an application server to a GSM device. End-users can only access applications resident on their SIM and, thus, need to update the applications on their SIM or obtain a new SIM to access new applications.

Updating such applications using SIM cards is an awkward process. One method is to update the SIM application via an OTA (Over-The-Air) platform. An OTA platform is effectively a computer equipped with the necessary software to remotely access a SIM card in a GSM phone and upload an application or other information onto the card. Even though utilizing an OTA platform for updating applications on a SIM card is theoretically possible, this method is not widely used. Uploading an application onto a remote SIM card over the air is a slow process. The application, typically five kilobytes in size, must be divided in fragments of approximately 140 bytes embedded in short messages. These messages are then sent to the SIM via SMS (short message service). For reliability, the OTA usually requests a delivery receipt from the handset. The risk for failure grows with the size of the application.

Another method of updating the applications on a SIM card is the connection of the handset or device to a computer by cable and the uploading of applications and data to the SIM card using software. A further method is the provisioning of a new SIM card to the end-user containing the updated applications is expensive as a new card must be securely mailed. Still further, the end-user must remove the currently-installed SIM card and replace it with the newer one.

Another method of application delivery for mobile devices is to provide a browser on the device, either as part of the handset or device, or on a SIM module. When the browser application is initiated by the handset, the browser fetches a generic page that includes links to other pages. The browser is not unlike a web browser on a desktop computer in that it is a request/response application; that is, it can only receive a page of information that it requests and cannot be forwarded a page or instructions that it did not request. Furthermore, many mobile devices are not equipped with a browser. Where provisioned, browser applications typically occupy seven kilobytes of the limited 16 to 32 kilobytes of memory that SIMs are typically provisioned with.

Further, information delivered to a browser on a mobile device is formatted in a markup language similar to HTML that, however, inherently has a large overhead associated with the tags defining formatting or other information, such as the location of a linked page.

Additionally, as browsers were designed to display simple information, they do not include the ability to execute instructions that would provide an application control over the device, such as the ability to dial a number on the handset.

SUMMARY OF THE INVENTION

It is therefore an object of the invention to provide a novel system, apparatus and method for enabling interaction between a mobile device and a dynamic list of remotely hosted applications that obviates or mitigates at least one of the disadvantages of the prior art.

In a first embodiment of the invention, there is provided a mobile terminal system, comprising: at least one mobile device for communication with at least one application server via a communication medium, the mobile devices having a user interface, a wireless communications interface and a removable module; a virtual machine implemented by the removable module, the virtual machine defined by a set of instructions enabling management of the mobile device; the removable module additionally having a wireless communication module enabling the virtual machine to receive a set of commands through the wireless communications interface from the at least one application server, the commands being chosen from the set of instructions; and at least one application hosted by the at least one application server, the at least one application having a first network interface for sending the set of commands and receiving a set of client data.

Preferably, the removable module and the at least one application server additionally comprise a cryptographic module to provide authentication between the mobile device and the at least one application server.

Also preferably, the cryptographic module encrypts and decrypts communication between the mobile device and the at least one application server.

In a preferred aspect of the first embodiment, the system additionally comprises: a first application server hosting a directory application, the directory application being configured to provide an application list response to the mobile device in response to an application list request from the mobile, enabling the mobile device to initiate interaction with one of the at least one application.

It is contemplated that the first application server has knowledge of at least one other application hosted by at least one other application server, and the application list response includes a set of addresses for the at least other one application hosted on the at least one other application server.

In another aspect of the first embodiment, the set of instructions consists of one byte op-codes.

In a further aspect of the first embodiment, the at least one application server is in communication with at least one data server and one of the applications on the at least one application server is operable to request and receive a data object from the at least one information server, reformat the data object for the virtual machine and transmit the reformatted data object to the mobile device. Data objects can include, but are not limited to, web pages or responses to database queries.

In a second embodiment of the invention, there is provided a mobile terminal device, comprising: a mobile device having a user interface, a removable module and a wireless communications interface for communicating with at least one application server; the removable module implementing a virtual machine enabling management of the mobile device through a set of instructions provisioned by the virtual machine; and a wireless communication module on the removable module enabling the virtual machine to transmit a set of client data through the wireless communications interface to the at least one application server and receive at least one command formed from the set of instructions.

In a third embodiment of the present invention, there is provided a removable module for use in a mobile device, comprising: non-volatile memory means for storage of at least one application and a set of application data; and the at least one application including a virtual machine defined by a set of instructions, and a communications module enabling the mobile device to receive a message in a first format natively handled by the mobile device and allowing the extraction from the message at least one command at least partially comprised of a subset of the set of instructions, such that when the removable module is deployed in the mobile device, the mobile device is able to receive the at least one command from an application server.

In another aspect of the embodiment, the removable module additionally comprises a communications module for extracting the at least one command from the message and an optional cryptographic module to provide authentication between the mobile device and the application server and possibly to encrypt communication to and decrypts communication from the application server.

In a further aspect of the embodiment, the removable module additionally comprises: processing means for executing the virtual machine; and volatile memory means enabling the temporary storage of a set of runtime data by the virtual machine.

Preferably, the set of instructions are mapped to one-byte op-codes.

Also preferably, the set of instructions enable the application server to remotely control the mobile device.

In another aspect of the embodiment, the set of instructions enables the virtual machine to receive the at least one command from the application server, allowing a user to initiate communication with a second application server upon selection thereof by a user of the mobile device.

In a fourth embodiment of the present invention, there is provided an application server for enabling a mobile device to access an application, comprising: a network interface for sending a set of messages to the mobile device and for receiving a set of communications from the mobile device, the mobile device implementing a virtual machine defined by a set of instructions, and the messages encapsulating at least one command chosen from the set of instructions; at least one application for interaction with the mobile device, the at least one application being operable to generate a set of directions for the mobile device, compile the set of directions into at least one command for execution by the virtual machine and package the at least one command in the set of messages natively handled by the mobile device.

In an aspect of the embodiment, the virtual machine is implemented by a removable module of the mobile device.

Preferably, the instructions are mapped to a set of one-byte op-codes and the at least one application compiles the set of directions at least partially into the one-byte op-codes.

In another aspect of the embodiment, the application server initiates a session by transmitting the at least one command to the mobile device without having received at least one communication from the mobile device.

Preferably, the set of instructions enables the application server to remotely control the mobile device.

In a further aspect of the embodiment, a directory application maintains a list of applications accessible to the mobile device, the directory application being operable to receive an application list request from the mobile device and return an application list response comprised of the set of directions required to instruct the virtual machine to display a menu of the list of applications that enables a user of the mobile device to select one of the applications in the list of applications and initiate communications with the application selected.

It is contemplated that at least one of the applications on the list of applications is hosted by a second application server, and selection of one of the applications by the user of the mobile device causes the mobile device to initiate a session with the second application server.

In a fifth embodiment of the present invention, there is provided a method of adding an application to an application server accessed by a mobile device; comprising: configuring the application for deployment on the application server; updating an application list indicating a set of available applications on the application server; receiving a request for the application list; and responding to the request with the updated application list, the updated application list being compiled at least partially into a set of commands chosen from a set of instructions provided by a virtual machine implemented by a mobile device; such that a user of the mobile device can select any one of the available applications from the application list and initiate interaction therewith.

In an aspect of the embodiment, the virtual machine is implemented on a removable module of the mobile device.

Preferably, the set of instructions is comprised of one-byte op-codes.

In a further embodiment of the invention, there is provided a system of managing a mobile device from a remote server, comprising: a remote server having a network interface for transmitting at least one command in at least one command communication over a wireless protocol; a mobile device having a user interface, a wireless communication interface and a removable module; a virtual machine implemented on the removable module, the virtual machine having a set of instructions enabling control of the mobile device; and the removable module having a wireless communication module for receiving the at least one command communication from the remote server received through the wireless communication interface, extracting the at least one command from the at least one command communication and forwarding the at least one command to the virtual machine, enabling the remote server to control the mobile device.

In another embodiment of the invention, there is provided a method of transferring sessional control on a mobile device from a first application hosted on a first application server to a second application hosted by a second application server, comprising: sending at least one command selected from a set of instructions provided by a virtual machine implemented on a removable module of the mobile device from the first application on the first application server through a first network interface thereon to the mobile device, thereby enabling the mobile device to send an initial request to the second application hosted on the second application server.

In an aspect of the embodiment, the virtual machine is implemented by a removable module of the mobile device.

In another aspect of the embodiment, the mobile device sends the initial request to the second application upon selection of the second application by a user of the mobile device.

Preferably, the set of instructions are comprised of one-byte op-codes.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
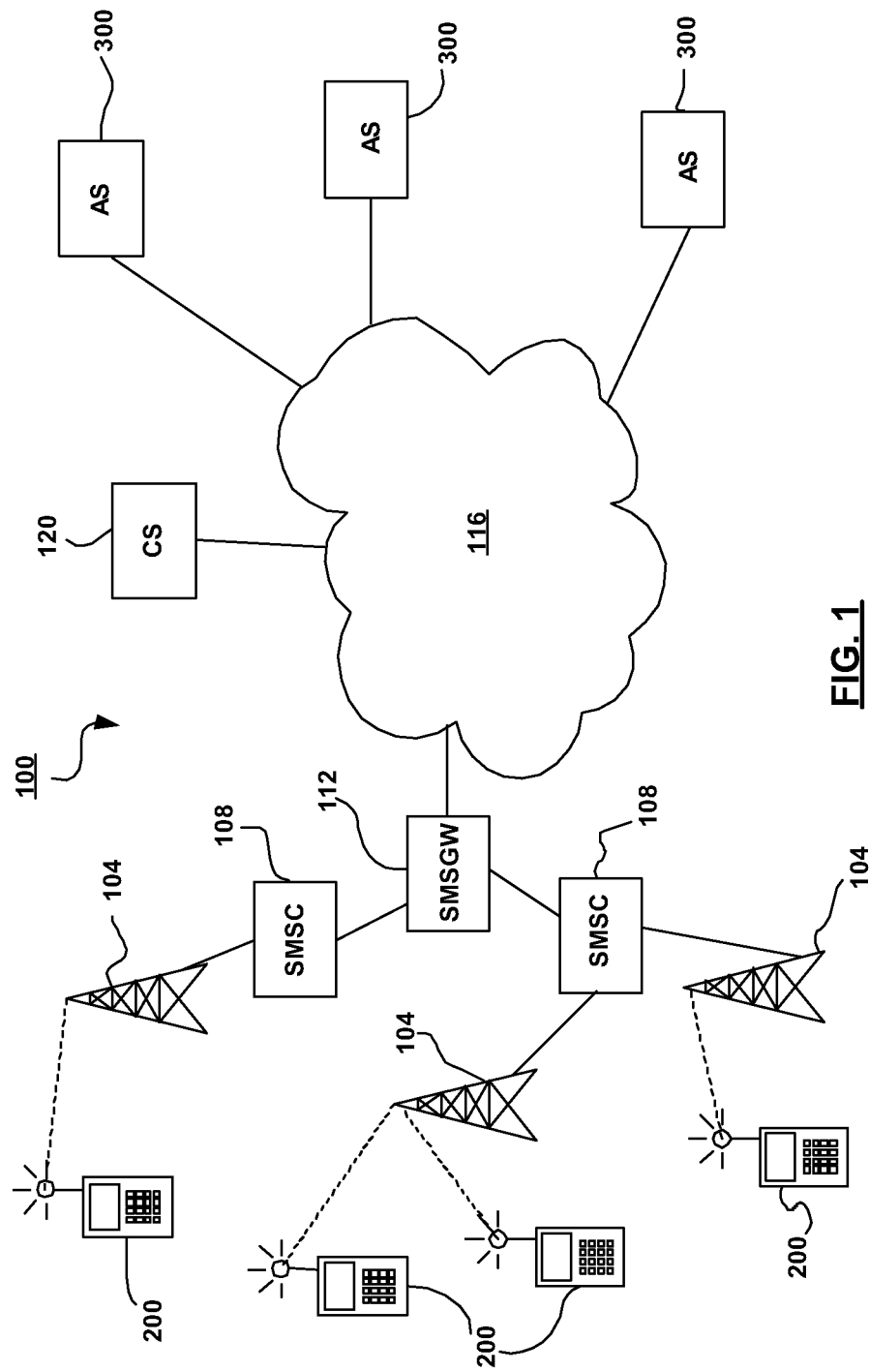
FIG. 1 is a block diagram of the mobile terminal device system in accordance with an embodiment of the present invention.

Referring now to FIG. 1, the mobile terminal device system in accordance an embodiment of the invention is indicated generally at 100. A plurality of mobile devices 200 are in communication with a number of base stations 104.

In an embodiment of the present invention, mobile devices 200 and base stations 104 communicate in accordance with the Global System for Mobile Communications (GSM) standard. Mobile devices 200 represent cellular telephone handsets that are Phase 2+ compliant. Such devices, for purposes of the present invention, are distinguished over prior GSM handsets in that they allow a new set of commands that enable direct access to various features of the handset. These commands are referred to as "proactive commands" and form part of the STK instruction set for Phase 2+ compliant devices.

In the present invention, mobile devices 200 send and receive communications via Short Message Service (SMS), a protocol introduced in the GSM standards and present since. SMS is a widely-adopted protocol akin to paging, enabling communications to be transmitted in 140-byte packets. It also allows information to be forwarded to the handset without an explicit request therefrom. This functionality is commonly referred to as "push" technology.

SMS messages received by a base station 104 are forwarded to a SMS Center (SMSC) 108. Upon receipt of an SMS message, SMSC 108 attempts to locate the addressee and forward the message. In a current embodiment of the invention, SMSC 108 forwards the SMS message to an SMS Gateway (SMSGW) 112 in communication with application servers 300 over a large network, such as the Internet 116.

SMSGW 112 serves three functions: the reformatting of messages (if required), the interfacing with the SMSCs 108 and the routing of these messages. The reformatting functionality required of SMSGW 112 depends on the topological location of SMSGW 112. For example, where SMSGW 112 is located in a wireless carrier's infrastructure, SMSGW 112 can communicate with SMSCs 108 via short message peer-to-peer protocol (SMPP) over the routing protocol implemented by the carrier's backbone, such as Internet protocol (IP) or X.25, and with application servers 300 via transmission control protocol over IP (TCP/IP) through the carrier's Internet point-of-presence. In this case, SMSGW 112 extracts the data from the SMPP datagram and, in some cases, concatenates and packages the data segments for transmission as a TCP/IP packet. SMSGW 112 then forwards the data to the addressee, an application server 300, over the Internet 116.

Communications from application servers 300 to mobile devices 200 travel the reverse route through the Internet 116, to SMSGW 112, then to SMSC 108 and finally to mobile device 100 via base station 104.

Figure 2:
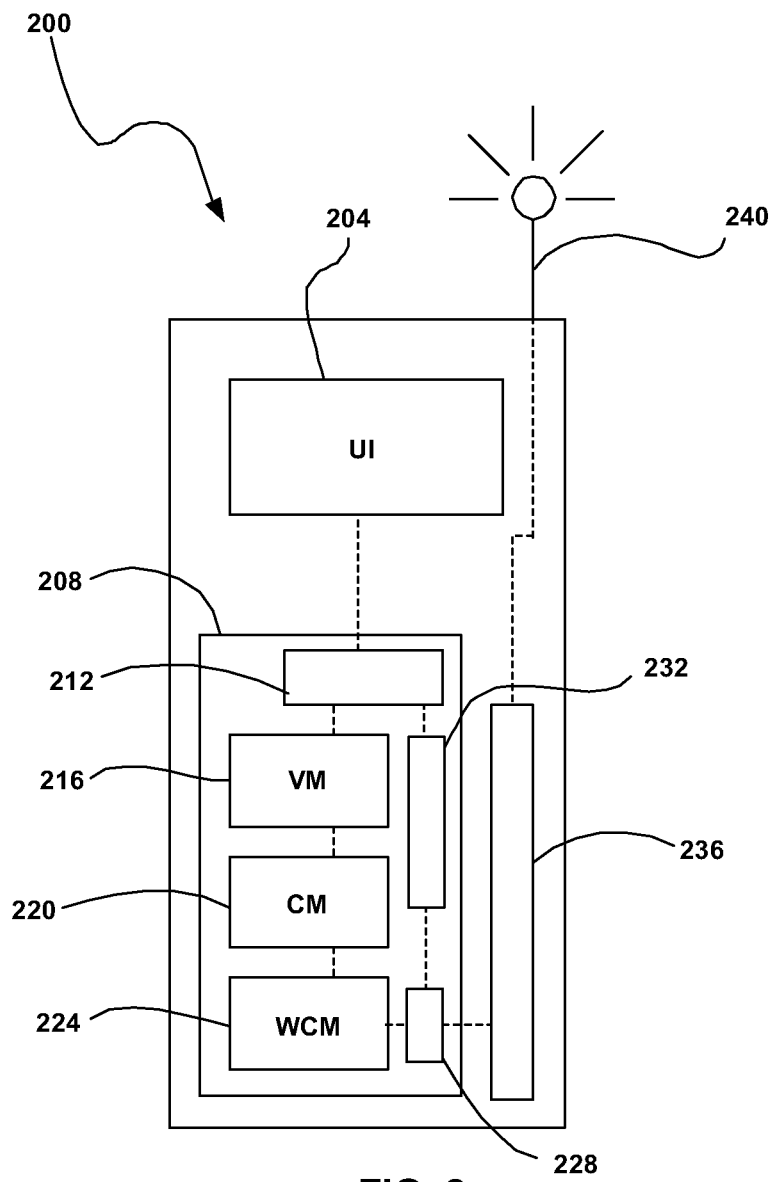
FIG. 2 is a schematic diagram of a mobile device used in the system of FIG. 1.

Referring now to FIG. 2, a mobile device 200 in accordance with the present invention is shown. User interaction with mobile device 200 is directed through a user interface 204. User interface 204 typically consists of a display screen and a keypad (both not explicitly shown). It is noted, however, that user interface 204 can be implemented in a number of ways, including, but not limited to, audio input and output.

A user can initiate interaction with an application resident on remote application server 300 by depressing a key on the keypad. A signal is sent from user interface 204 to a subscriber identity module (SIM) 208.

SIM 208 is effectively a system on a chip that includes a microprocessor, read-only memory (ROM), persistent electrically-erasable programmable read-only memory (EEPROM), volatile random access memory (RAM) and a serial input/output interface. SIM 208 is typically loaded with an operating system that implements a file system and executes a number of applications. This software is loaded into the ROM and the EEPROM by either the manufacturer or vendor of SIM 208, or the provider of the wireless service. The SIM relies on the GSM handset for battery power and clock maintenance.

Mobile device 200 relies on SIM 208 to execute authentication algorithms to identify the user to the wireless service provider's network, use cryptographic keys stored in EEPROM for authentication, store data for various services such as abbreviated number dialing and SMS, and store applications.

In the present invention, SIM 208 is provisioned with a set of additional applications to enable the enhanced functionality. These applications are typically loaded prior to distribution to an end-user, but can also be uploaded to SIM 208 via an over-the-air (OTA) system.

Upon receipt of a message from user interface 204, a logic subsystem 212 determines whether or not the message is directed to an application hosted by application server 300. If the message is directed to an application hosted by application server 300, the message is forwarded to wireless communication module 224 optionally by way of cryptographic module 220, otherwise it is sent on to other functionality 232 implemented by SIM 208, such as a voice call or a text SMS.

In the presently preferred embodiment of the invention, upon request for initiation of a session with an application hosted on remote application server 300, the request is forwarded to a cryptographic module 220. Cryptographic module 220 provides a number of services. Typically, cryptographic module 220 encrypts all communications to remote application server 300. A variety of encryption schemes can be employed, but where sensitive information is being transmitted, it is more common to either fully encrypt all communications via public key encryption or use public key encryption to obtain a symmetric session key. Although encryption is currently available, end-to-end security is not provided. Transmissions are only encrypted between mobile device 200 and base station 104 and then from an encryption-enabled server from within the wireless service provider's infrastructure to the other end, leaving data unencrypted from base station 104 to the encryption-enabled server, typically at the wireless service provider's point-of-presence for the Internet. Further, the algorithms used for encrypting transmissions between mobile devices 200 and base stations 104, such as A5/1, are considered to be weak and, as such, susceptible to attack.

Further, the ability of SIM 208 to digitally sign a message enables a variety of applications where non-repudiation is essential, such as m-commerce, banking, etc.

Once the message has been encrypted, it is forwarded to a wireless communication module 224. Wireless communication module 224 prepares the message for transmission by segmenting the message, if necessary, and packaging it as an SMS message that is readily handled by the standard functionality of the handset.

The SMS message is then forwarded to a radio 236 for transmission through antenna 240 to base station 104.

Figure 3:
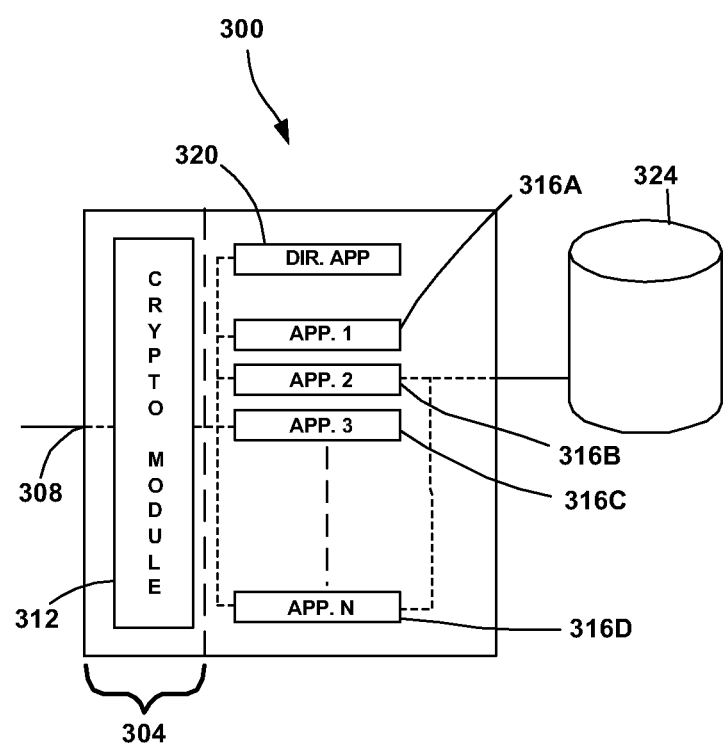
FIG. 3 is a schematic diagram of an application server used in the system of FIG. 1.

Now referring to FIG. 3, application server 300 is shown in accordance with an embodiment of the invention. The message from mobile device 200 is received by an application server front end 304 on a network interface 308. Application server front end 304 can be a separate process running on the same physical device as application server 300 or can be placed on a separate physical device. Network interface 308 assembles the message from the TCP/IP packets received and passes the message to a cryptographic module 312 that decrypts the message encrypted by cryptographic module 220. Cryptographic module 312 can also verify a digital signature if one has been appended to the message to ensure that the message was sent from a specific handset.

Where cryptographic module 312 does not possess a required certificate for mobile device 200, it can obtain the required certificate from a certificate server 120.

The message is then forwarded one of at least one application 316 hosted by application server 300. Application server 300, upon completion of processing of the message by cryptographic module 312, launches the addressed application 316, if not then running, and passes the message to it.

In a presently preferred embodiment of the invention, the initial message from mobile device 200 to application server 300 is a request for a list of applications hosted thereon. Upon receipt of this request, application server 300 forwards it to a directory application 320 which has or can obtain knowledge of a list of applications 316 hosted by application server 300. Directory application 320 receives this request and generates a list of applications 316 and the address of each application. Application server 300 then generates the necessary code to display an interactive menu on mobile device 200 and, from it, compiles byte code for execution by a virtual machine 216 implemented by SIM 208, embedding the application list and application location information in the executable code.

In a particular embodiment, the list of applications 316 maintained by application server 300 includes applications hosted by other application servers.

When a new application 316D is to be made available to mobile device 200, new application 316D is first installed on application server 300. The new application is then added to the list of applications available on application server 300 that is accessed through directory application 320. As a result, any subsequent responses by directory application 320 to requests for a list of applications will enable the user of mobile device 200 to select and access new application 316D.

Conversely, where an application 316C is to be removed from service, the list of applications available through directory application 320 is first updated to remove the reference to application 316C, then application 316C can be removed from the application server upon which it resides, provided that no sessions are active with application 316C.

The response is transferred to application server front end 304, where it is signed and encrypted by cryptographic module 312 before transmission over the Internet to SMSGW 112 via network interface 308. As a large degree of control can be obtained over mobile device 200 via the method of the invention, it is common practice to have application server 300 digitally sign messages before transmission to mobile device 200 to reduce the ability of an unauthorized party to take control of the handset.

Referring again to FIG. 1, the communication is forwarded to SMSGW 112 where it can be segmented and packaged as SMS messages for transmission as SMPP traffic and sent on to the appropriate SMSC 108 for final transmission to mobile device 200 through base station 104. While SMSCs 108 have the ability to store a message for later forwarding if the intended recipient is inactive, such as when a handset has been turned off or is out of range, this feature remains largely unutilized except where the SMSC 108 is directed to retry sending a message to a mobile device for a short period of time in order to maintain a connection between an SMSC 108 and a mobile device 200 with a connection of poor quality.

Referring again to FIG. 2, mobile device 200 receives the response via antenna 240. The response is then passed to radio 236 and forwarded to a protocol listener 228. Protocol listener 228 determines whether the SMS message is addressed to virtual machine 216 or to another application 228. SMS messages have an eight-byte header, a one-byte portion, the protocol identifier, of which indicates the target of the message, not unlike a port number for TCP/IP packets. In cases where the SMS packet payload is a binary executable download, this byte is set to "7F". SMS packets can contain a number of other types of payloads, including, but not limited to, a text message to be displayed immediately on the display means of mobile device 200, for which the protocol identifier is set to "0". In the case where the message is a command stream to generate a menu with a list of applications 316 hosted by one or more application servers 300 and their addresses, the message is forwarded to SIM 208. Upon receipt of the envelope commands, an application launcher thereon refers to a configuration file and selects an appropriate application for launching. Where the message is generated by application server 300, the message is forwarded to wireless communication module 224, where the data is extracted from the received SMS packets and reassembled, where necessary.

Once the message is extracted and reassembled, it is forwarded to cryptographic module 220 where it is decrypted and the signature is authenticated. By doing so, only commands sent by authorized parties are executed and replay attacks are nullified.

Where mobile device 200 contacts an application server 300 with which it is not familiar (that is, for which it has no digital certificate) to perform a "handshake", mobile device 200 will receive a signed transmission that it is unable to verify, but that bears a unique certificate ID for the digital certificate of application server 300. Mobile device 200 can send a "fetch" command to certificate server 120. In preparing the "fetch" command, SIM 208 specifies the unique certificate ID of the certificate to be fetched from certificate server 120. Certificate server 120 responds to mobile device 200 with the certificate of the recently contacted application server 300, thus allowing mobile device 200 to verify the signature of the new application server 300. The new digital certificate is typically cached for later use.

The "fetch" request from mobile device 200 can also contain information about the certificates of certificate authorities and certificate servers 120 that SIM 208 is aware of. In this case, certificate server 120 can determine the validity of the certificate and provide current certificates for certificate server 120 and certificate authority, where the certificates known to SIM 208 are found to be revoked, expired or invalid for any other reason.

Alternatively, where mobile device 200 possesses a certificate for the new application server 300, it can forward information about the certificate to certificate server 120 or other authority to ensure it has not expired, been revoked, etc. Certificate server 120 can then either provide confirmation of the validity of the certificate or forward mobile device 200 a new digital certificate, where appropriate. In a further alternative, mobile device 200 can discard a digital certificate upon the termination of a connection with application server 300 and fetch a new copy upon reconnection thereto. Digital certificates can also be forwarded to mobile device 200 via OTA platform, where required.

Once verified, the commands are forwarded to virtual machine 216 for execution. Virtual machine 216 is an application environment defined by a set of instructions similar to a physical processor. In a presently preferred embodiment, there are approximately 50 such instructions, including "add", "subtract", "Xor", "push" and "pop". Other instructions control the display of information through and the handling of input or messages from user interface 204. Further, a subset of these instructions known as "proactive commands" provides control over the handset. By accessing this subset, an application can cause device 200 to perform a variety of functions, including the initiation of a voice call, the configuration of a menu, the display of text, the sounding of an alarm or the transmission of an SMS message.

A powerful feature of the instruction set defined for virtual machine 216 implemented on SIM 208 is that the approximately 50 available instructions are all mapped out to one byte op-codes. This allows a number of commands to be sent to mobile device 200 via shorter transmissions than otherwise possible, thus reducing use of limited wireless bandwidth and improving response times.

In the case where the commands are received in response to an initial request for a list of applications 316 hosted by application server 300, the commands can direct user interface 204 to display the list of applications 316 and allow a user to select one of the applications 316. Upon selection of an application 316 from the list of applications 316, the mobile device sends an initial message to the selected application 316. Where the selected application resides on a separate server, mobile device 200 initiates a communication with the separate server.

One advantage of such a system is that the applications 316 available to mobile device 200 can be dynamically configured without the need to update the applications resident on the handset itself.

It is noted that static portions of the applications delivered to mobile device 200 can be cached thereon for later use, thus reducing retransmission of previously received information.

In another aspect of the invention, application 316A can initiate communication with mobile device 200. For example, application 316A may query a database 324 routinely to determine if an event is scheduled for mobile device 200. If database 324 indicates that an event is scheduled for mobile device 200, application 316A can send an initial message to mobile device 200, comprising a set of commands contained in one or more SMS packets, directing the handset to display text, send an SMS message, place a voice call, emit a sound, etc. Application 316A can be triggered to contact mobile device 200 upon the realization of a threshold price by a stock, both selected by an end-user. In such an example, application 316A can request confirmation of receipt of the message by the mobile device user by means of the user keying in the appropriate response on mobile device 200, causing cryptographic module 220 to sign a request acknowledgement for forwarding back to application server 300. Another example of such an application is localized advertising delivered to mobile device 200 based on the location of mobile device 200.

While the embodiments discussed herein are directed to specific implementations of the invention, it will be understood that combinations, sub-sets and variations of the embodiments are within the scope of the invention. For example, application servers 300 can be deployed within the wireless service provider's infrastructure.

Virtual machine 216 can be implemented in hardware for example on an Application Specific Integrated Circuit (ASIC) and built into mobile device 200 or onto removable module 208.

Universal SIMs, or USIMs, scheduled for implementation in other TDMA and CDMA-enabled mobile devices can be provided the same functionality as described for a SIM.

Handheld computing devices can be fitted with suitable modules to enable like functionality thereon and access to applications 324 on application servers 300. As handheld computing devices do not typically rely on expansion modules or cards for processing power, it is contemplated that the card must only contain the information required for handheld computing devices to implement virtual machine 216 using processing and memory means already present on the device. The software to implement virtual machine 216, plus any additional modules and certificates, may be placed in non-volatile memory on a card that also provides wireless communication functionality.

Further variations can include a first application server 300 accessing an application on another server on the Internet and reformatting the output for mobile device 200. For example, first application server 300 can retrieve a web page from a web server and format it for presentation on mobile device 200. First application server 300 then compiles the reformatted information for interpretation by virtual machine 216. This enables mobile device 200 to access information for which it does not have a client application installed. Another example is a method of accessing data on a database server, whereby first application server 300 queries a database server and reformats and compiles the data object received from the database server in response to the query, perhaps a set of records.

In a still further variation, mobile device 200 can be configured to connect to an application server 300 situated proximal to mobile device 200, such as one located within the wireless carrier's infrastructure possessing knowledge of the applications available on other application servers. Such an application server can be configured to perform as a proxy for the other application servers and, further, cache the static portions of the applications.

Additionally, a first application server 300 can invisibly redirect mobile device 200 for load balancing, localization, etc.

While particular embodiments of the invention have been disclosed specifically relating to the field of mobile devices and wireless communications, it will be understood by those of skill in the art that the invention is useful wherever a device has limited processing, storage and communication means, such as, for example, a personal digital assistant communicating over an infrared link or connected to a network via a relatively slow serial connection.

The present invention provides a novel system, method and apparatus for dynamically altering the applications accessible to a mobile device. Other advantages to the present invention will be apparent to those of skill in the art.

The above-described embodiments of the invention are intended to be examples of the present invention and alterations and modifications may be effected thereto, by those of skill in the art, without departing from the scope of the invention which is defined solely by the claims appended hereto.

I claim:

1. A mobile terminal system, comprising:
   an application server hosting an application, the application server comprising: a memory configured to store the application, the application configured to generate a set of commands for native execution by a virtual machine, wherein the virtual machine is different than the application server; and a wireless communication interface coupled to the memory and configured to transmit the set of commands to the virtual machine for native execution by the virtual machine, wherein the set of commands comprise one-byte opcodes;
   a mobile device, the mobile device comprising: a wireless communication interface configured to receive the set of commands from the application server; and a removable module removably attached to the mobile device via an input/output interface on said removable module,
   wherein the removable module implements the virtual machine to execute the set of commands received from the wireless communication interface, wherein the virtual machine executes the application on behalf of the application server using the set of commands received from the wireless communication interface, and wherein the set of commands comprises proactive commands that enable direct access and control over features of the mobile device,
   wherein proactive commands comprise a command to perform a function selected from a group consisting of initiation of a voice call, configuration of a menu, sounding of an alarm and transmission of an SMS message, said virtual machine defined by a set of instructions enabling management of said mobile device and resident on said removable module.

2. The mobile terminal system of claim 1, wherein said application server additionally comprise a cryptographic module to provide authentication between said mobile device and said application server.

3. The mobile terminal system of claim 2, wherein said cryptographic module encrypts and decrypts communication between said mobile device and said application server.

4. The mobile terminal system of claim 2, additionally comprising: at least one certificate server able to receive a request for a digital certificate of said application server and respond with said digital certificate, such that said mobile device is able to obtain said digital certificate.

5. The mobile terminal system of claim 4, wherein said at least one certificate server is able to receive a request for validation of a cached digital certificate stored on said mobile device and provide an updated digital certificate or a notification that said cached digital certificate could not be validated.

6. The mobile terminal system of claim 5, wherein said digital certificate for said at least one application server is transmitted by an OTA server to said mobile device.

7. The mobile terminal system of claim 1, additionally comprising:
   a gateway with a second network interface for sending and receiving a set of communications to and from said mobile device, a third network interface for sending and receiving said set of communications to and from said at least one application server and processing means to reformat said set of communications between a first protocol handled by said wireless communication interface of said mobile device and a second protocol handled by said first network interface of said application server.

8. The mobile terminal system of claim 7, wherein said first protocol is SMPP.

9. The mobile terminal system of claim 7, wherein said second protocol is TCP/IP.

10. The mobile terminal system of claim 1, additionally comprising:
    a first application server hosting a directory application, said directory application being configured to provide an application list response to said mobile device in response to an application list request from said mobile device, enabling said mobile device to initiate interaction with one of said at least one application.

11. The mobile terminal system of claim 10, wherein said application server is a first application server, said first application server having knowledge of at least one other application hosted by a second application server, and said application list response includes a set of addresses for said at least other one application hosted on said second application server.

12. The mobile terminal system of claim 1, wherein said mobile device is a GSM Phase II+-compatible device and said removable module is a subscriber identity module.

13. The mobile terminal system of claim 1, wherein said removable module is a universal subscriber identity module.

14. The mobile terminal system of claim 1, wherein said virtual machine is implemented in an application specific integrated circuit on said module.

15. The mobile terminal system of claim 1, wherein said application server is in communication with at least one data server and one of said applications on said application server is operable to request and receive a data object from said at least one information server, reformat said data object for said virtual machine and transmit said reformatted data object to said mobile device.

16. The mobile terminal system of claim 15, wherein said data object is a web page.

17. The mobile terminal system of claim 15, wherein said data server is a database server.

18. A mobile terminal device, comprising:
a mobile device having a removable module removably attached to said mobile device via an input/output interface on said removable module and a wireless communications interface for communicating with a remotely-located application server;
said removable module implementing a virtual machine resident on said removable module enabling management of said mobile device through a set of instructions received by said virtual machine via the wireless communications interface from said remotely-located application server, wherein the set of instructions comprises proactive instructions that enable direct access and control over features of the mobile device; and
a wireless communication module on said removable module enabling said virtual machine to transmit a set of client data through said wireless communications interface to said remotely-located application server and receive at least one command formed from said set of instructions, the at least one command generated by the remotely-located application server;
wherein proactive commands comprise a command to perform a function selected from a group consisting of initiation of a voice call, configuration of a menu, sounding of an alarm and transmission of an SMS message,
wherein said at least one command is natively executed by said virtual machine; and
wherein said at least one command is a one-byte op code.

19. A removable module for use in a mobile device, comprising:
an input/output interface on said removable module operative to removably attach said removable module to said mobile device;
non-volatile memory means;
a virtual machine defined by a set of instructions resident on said non-volatile memory means, said virtual machine enabling management of said mobile device; and
a communications module defined by a set of instructions resident on said nonvolatile memory means, said communications module enabling said mobile device to receive a message generated by a remotely-located server in a first format natively handled by said mobile device and allowing the extraction from said message at least one command at least partially comprised of a subset of said set of instructions to be natively executed by the virtual machine,
wherein said set of instructions comprise one-byte op codes, and wherein the set of instructions comprises proactive commands that enable direct access and control over features of the mobile device,
wherein proactive commands comprise a command to perform a function selected from a group consisting of initiation of a voice call, configuration of a menu, sounding of an alarm and transmission of an SMS message.

* * * * *